United States Patent Office 3,007,913
Patented Nov. 7, 1961

3,007,913
METAL-CONTAINING AZO DYESTUFFS
Piero Maderni and Hans Ruckstuhl, Basel, Switzerland, assignors, by mesne assignments, to Saul & Co., Newark, N.J., as nominee of Fidelity Union Trust Company, executive trustee under Sandoz Trust
No Drawing. Filed Jan. 25, 1954, Ser. No. 406,084
Claims priority, application Switzerland Jan. 29, 1953
8 Claims. (Cl. 260—146)

The present invention relates to new metal-containing azo dyestuffs.

A primary object of the invention is the embodiment of metal-containing azo dyestuffs of especial utility in the dyeing of wool, silk, leather and synthetic nitrogen-containing fibers, f.i. polyamide fibers (e.g. nylon, Perlon) from neutral or weakly acid dyebaths. This object is realized by the dyestuffs according to the invention, which correspond to the formula

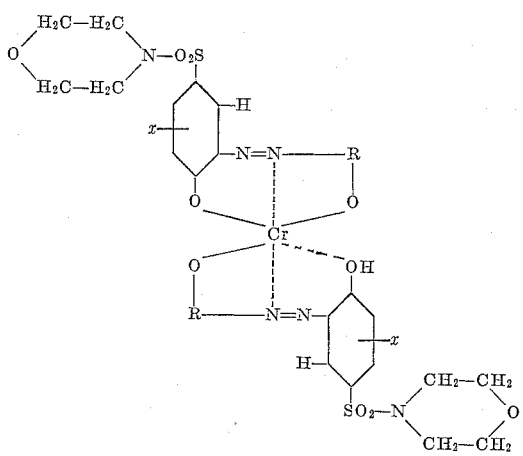

wherein $$\begin{array}{c} O- \\ | \\ R- \end{array}$$

stands for the residue of a coupling component free of sulfonic and carboxylic acid groups and chosen from 3-methyl-5-pyrazolones, acetoacetylamino-alkanes, acetoacetylamino-aryl derivatives of the benzene and naphthalene series, and hydroxy-aryl derivatives of the benzene and naphthalene series, whereby $$\begin{array}{c} O- \\ | \end{array}$$

is in ortho-position to —N=N—, and $x$ stands for hydrogen, halogen, nitro or lower alkyl.

These new dyestuffs are obtained by coupling one mol of the diazo compound of a 2-aminobenzene sulfonic acid morpholylamide of the formula

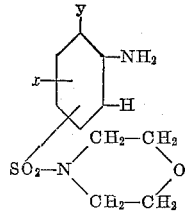

wherein $x$ stands for hydrogen, halogen, nitro or lower alkyl, and $y$ stands for hydroxy or lower alkoxy, with one mol of a coupling component free of sulfonic and carboxylic acid groups and chosen from 3-methyl-5-pyrazolones, acetoacetylamino-alkanes, acetoacetylamino-aryl derivatives of the benzene and naphthalene series, and hydroxy-aryl derivatives of the benzene and naphthalene series, whereby the enolic or phenolic hydroxy group stands in ortho-position to the carbon atom capable of coupling, and by treating the thus-obtained monoazo compound with a chromium-yielding agent.

The coupling of the diazo compounds with the azo components as well as the working up and the separation of the resulting products are advantageously carried out in a neutral or weakly alkaline medium. When using the 1-hydroxy-naphthalenes as azo components, it is preferable to work in a caustic alkaline medium; thus, coupling takes place in ortho-position to the hydroxy group.

The conversion of the monoazo compounds into the chromium-containing azo dyestuffs is effected with e.g. the salts of chromium such as chromium fluoride, chromium sulfate, chromium formate, chromium acetate, potassium chromium sulfate and ammonium chromium sulfate, either in an aqueous suspension or solution or in an organic medium, e.g. in formamide or in a melt of an alkali metal salt of an aliphatic monocarboxylic acid having a low molecular weight. Metallization in an aqueous caustic alkaline medium is especially advantageous, in which case the metal salts are added in the presence of such compounds, as maintain the chromium in solution in the caustic alkaline medium in complex combination, as, e.g., tartaric acid, citric acid, or lactic acid. For the preparation of the chromium complex compounds there are also suitable the chromates, as e.g. sodium chromate, potassium chromate, sodium bichromate and potassium bichromate. The chroming of the monoazo dyestuffs with chromates is effected in a strong alkaline medium.

If the monoazo compound contains an alkoxy group as a group favourable to metal complex formation, then the metallization is advantageously carried out in an organic solvent, for example in a glycol such as ethylene glycol, ethylpolyglycol, or butylpolyglycol, and in the presence of an acid-binding agent such as sodium acetate.

It has also been found that particularly valuable metal-containing azo dyestuffs are obtained if less than one atom of metal is used for each molecule of the monoazo compound, especially if the so-called 1:2 complexes are produced, wherein about one atom of metal is present for two molecules of azo compounds.

The resulting metal-containing azo dyestuffs are separated out from the aqueous medium by the addition of salt, if desired after pouring the organic metallizing solution into water, being thereupon filtered off, washed and dried. Many of these dyestuffs possess an outstanding power of exhaustion from neutral dyebaths; therefore they generally dye wool from neutral and silk from weakly acid dyebaths in level and rich yellow, brown-yellow, orange, red, bordeaux, violet and gray shades of very good fastness to milling and washing and of most excellent fastness to light. The new dyestuffs are also valuable for the dyeing of leather and particularly of nitrogenous artificial fibers such as the synthetic polyamide fibers, e.g. nylon, Perlon.

The following examples illustrate the invention without limiting it. Therein the parts denote parts by weight, the percentages percentages by weight, and the temperatures are given in degrees centigrade.

EXAMPLE 1

25.8 parts of 1-hydroxy-2-aminobenzene-4-sulfonic acid morpholylamide are diazotized indirectly in the usual manner and combined with 20.9 parts of 1-(3'-chloro)-phenyl-3-methyl-5-pyrazolone in an aqueous solution made alkaline with sodium carbonate. The resulting monoazo compound precipitates immediately. It is filtered, washed and dried and is a brown-red powder which dissolves in concentrated sulfuric acid with a yellow color and in dilute sodium carbonate solution with a yellow-orange color.

In order to form the chromium-containing azo dyestuff, 47.8 parts of the dried monoazo compound are dissolved in 600 parts of water with 80 parts of 10% sodium hydroxide solution at 95°. A mixture of 15 parts of sodium bichromate and 75 parts of water, made neutral with sodium hydroxide, is added to the solution. The material is boiled under reflux until the dyestuff is completely metallized. The dyestuff is isolated from the alkaline solution by salting out and filtration. The dried metal-containing azo dyestuff is a brown-red powder which dissolves in concentrated sulfuric acid giving a yellow color and in water giving a red-orange color. It corresponds to the formula

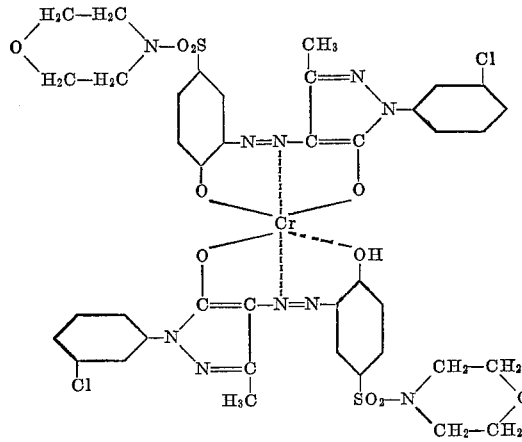

and dyes wool, silk and polyamide fibers from a neutral to acetic acid bath in rich orange shades. The dyeings have an excellent fastness to milling, washing and light.

EXAMPLE 2

25.8 parts of 1-hydroxy-2-aminobenzene-4-sulfonic acid morpholylamide are diazotized indirectly in the usual manner and combined with 26.7 parts of 1-phenyl-3-methyl-5-pyrazolone-3'-sulfonic acid methylamide in an aqueous solution made alkaline with sodium carbonate. The resulting red monoazo compound is filtered and dried. It dissolves in concentrated sulfuric acid with a yellow-orange color. The chromium-containing azo dyestuff prepared according to the data of Example 1 is a brown-red powder which dissolves in concentrated sulfuric acid with a yellow color and in water with an orange color. It corresponds to the formula

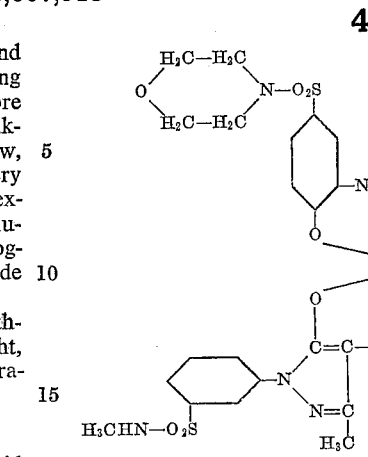

and dyes wool, silk and synthetic polyamide fibers from neutral to acetic acid baths in rich orange shades of excellent fastness to milling, washing and light.

EXAMPLE 3

27.2 parts of 1-methoxy-2-aminobenzene-4-sulfonic acid morpholylamide are diazotized indirectly. The diazo suspension is run into a solution of 24 parts of 1-carbethoxyamino-7-hydroxynaphthalene, 14 parts of a 30% sodium hydroxide solution, 20 parts of sodium carbonate and 670 parts of water at 0–2°. Within 2 hours the reaction mixture is added to 22.5 parts of a 30% sodium hydroxide solution and then stirred until the coupling is completed. The resulting monoazo compound is precipitated by the addition of sodium chloride to the reaction mixture, subsequently filtered and dried.

The monoazo compound is converted into the chromium complex by heating it for 3 hours with 25 parts of potassium chromium (III) sulfate and 600 parts of formamide to 120–130°; the chromium-containing azo dyestuff is then isolated in the usual manner. It corresponds to the formula

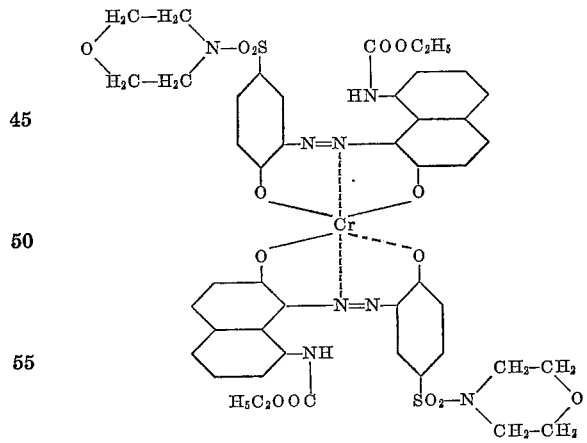

and dissolves in concentrated sulfuric acid with a bluish-red, in hot water with a gray-blue color, and dyes wool, silk and synthetic polyamide fibers from a neutral to weakly acid bath in gray shades fast to milling, washing and light.

In order to carry out the de-alkylating chroming process there may be used instead of formamide as an organic solvent also glycols such as ethylene glycol, ethylpolyglycol or butylpolyglycol.

In the following table further examples are enumerated. The dyestuffs can be obtained by coupling the diazotized 1-hydroxy-2-aminobenzene-sulfonic acid morpholylamide (column II of the table, "Diazo component") with an azo component which is free of sulfonic acid and carboxylic acid groups and possesses an enolic or phenolic hydroxy group in ortho-position to the carbon atom capable of coupling (column III of the table, "Azo component"). The resulting monoazo compound is subsequently treated with a metal-yielding agent (the dyestuffs are characterized in the column IV of the table by the shades of dyeings produced by the chromium complex).

Table

| Example Nr. (I) | Monoazo compound | | Shade of dyeings on wool—chromium complex (IV) |
|---|---|---|---|
| | Diazo component (II) | Azo component (III) | |
| 4 | 1-hydroxy-2-aminobenzene-4-sulfonic acid morpholylamide. | 1-(2'.5'-dichloro)-phenyl-3-methyl-5-pyrazolone. | orange. |
| 5 | ....do.... | 3-methyl-5-pyrazolone. | Do. |
| 6 | ....do.... | 1-phenyl-3-methyl-5-pyrazolone. | Do. |
| 7 | ....do.... | 1-(4'-methyl)-phenyl-3-methyl-5-pyrazolone-3'-sulfonic acid methylamide. | Do. |
| 8 | ....do.... | 1-(3'-ethyl)-phenyl-3-methyl-5-pyrazolone. | Do. |
| 9 | ....do.... | 1-(4'-chloro)-phenyl-3-methyl-5-pyrazolone-3'-sulfonic acid ethylamide. | Do. |
| 10 | ....do.... | 1-(5'.6'.7'.8'-tetrahydro)-naphthyl(1')-3-methyl-5-pyrazolone. | Do. |
| 11 | ....do.... | 1-decahydronaphthyl(2')-3-methyl-5-pyrazolone. | Do. |
| 12 | ....do.... | 1-acetoacetylamino-3-chlorobenzene. | yellow. |
| 13 | ....do.... | 1-acetoacetylamino-3-cyano-4-methylbenzene. | Do. |
| 14 | ....do.... | 1-acetoacetylaminonaphthalene. | Do. |
| 15 | 1-hydroxy-2-aminobenzene-4-sulfonic acid morpholylamide. | 2-acetoacetylaminonaphthalene. | Do. |
| 16 | ....do.... | 1-acetoacetylaminooctane. | Do. |
| 17 | ....do.... | 1-hydroxy-2-acetylamino-4-methylbenzene. | brown. |
| 18 | ....do.... | 1-hydroxy-2-propionylaminobenzene-4-tert.butylbenzene. | Do. |
| 19 | ....do.... | 1-hydroxy-2.4-dimethylbenzene. | Do. |
| 20 | ....do.... | 2-hydroxynaphthalene-6-sulfonic acid amide. | brown-violet. |
| 21 | ....do.... | 1-acetylamino-7-hydroxynaphthalene. | gray. |
| 22 | ....do.... | 1-carbo-(2'-ethoxy)-ethoxyamino-7-hydroxy-naphthalene. | Do. |
| 23 | ....do.... | 1-hydroxy-5.8-dichloronaphthalene. | dull violet. |
| 24 | 1-hydroxy-2-amino-6-bromobenzene-4-sulfonic acid morpholylamide. | 1-phenyl-3-methyl-5-pyrazolone-3'-sulfonic acid methylamide. | orange. |
| 25 | ....do.... | 1-phenyl-3-methyl-5-pyrazolone-3'-sulfonic acid-(3''-methoxy)-propylamide. | Do. |
| 26 | 1-hydroxy-2-amino-6-chlorobenzene-4-sulfonic acid morpholylamide. | 1-phenyl-3-methyl-5-pyrazolone-4'-sulfonic acid-(3''-sulfamido)-phenylamide. | Do. |
| 27 | ....do.... | acetoacetylaminobenzene. | yellow. |
| 28 | 1-hydroxy-2-amino-6-nitrobenzene-4-sulfonic acid morpholylamide. | 1-phenyl-3-methyl-5-pyrazolone-4'-sulfonic acid-(3''-sulfamido)-phenylamide. | orange. |
| 29 | ....do.... | 1-acetylamino-7-hydroxynaphthalene. | gray. |
| 30 | 1-hydroxy-2-amino-6-methylbenzene-4-sulfonic acid morpholylamide. | acetoacetylaminobenzene. | yellow. |

EXAMPLE 31

A dyebath is made up from the following: 500 parts of water, 1 part of anhydrous sodium sulfate and 0.2 part of the dyestuff obtained in Example 2. 10 parts of prewetted wool are placed into this dyebath at 30° and the dyebath is brought to 100° during approximately 15 minutes. This temperature is maintained for 60 minutes and during this time a further 0.2 part of concentrated acetic acid is added. The dyeing is then removed from the bath, rinsed and dried.

The dyestuffs prepared in the remaining examples are used to produce dyeings in a similar manner.

Having thus disclosed the invention what is claimed is:

1. A chromium-containing azo dyestuff which corresponds to the formula

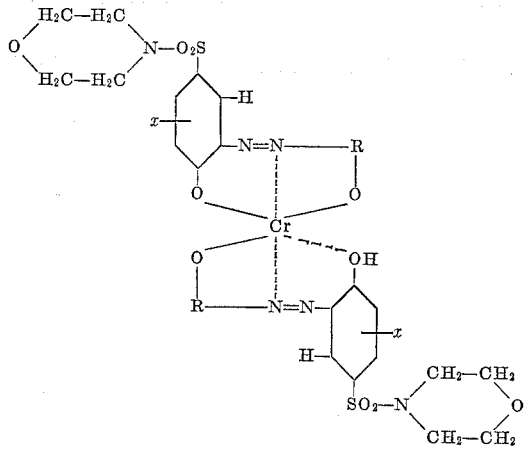

wherein

stands for the residue of a coupling component free of sulfonic and carboxylic acid groups and selected from the group consisting of 3-methyl-5-pyrazolones, acetoacetylamino-alkanes, acetoacetylamino-aryl derivatives of the benzene and naphthalene series, and hydroxy-aryl derivatives of the benzene and naphthalene series,

being in ortho-position to $-N=N-$, and $x$ stand for a member selected from the group consisting of hydrogen, halogen, nitro and lower alkyl.

2. The metal-containing azo dyestuff which corresponds to the formula

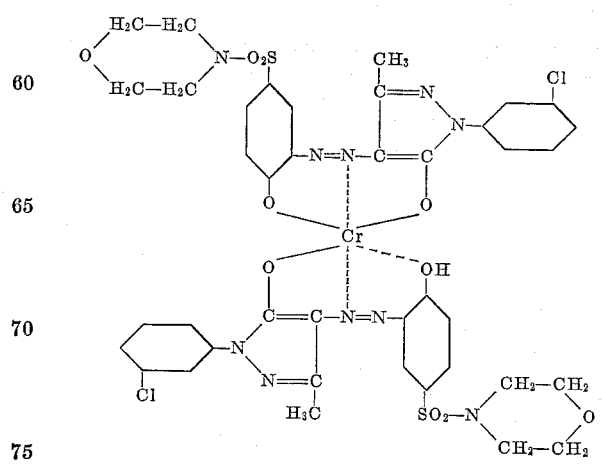

3. The metal-containing azo dyestuff which corresponds to the formula

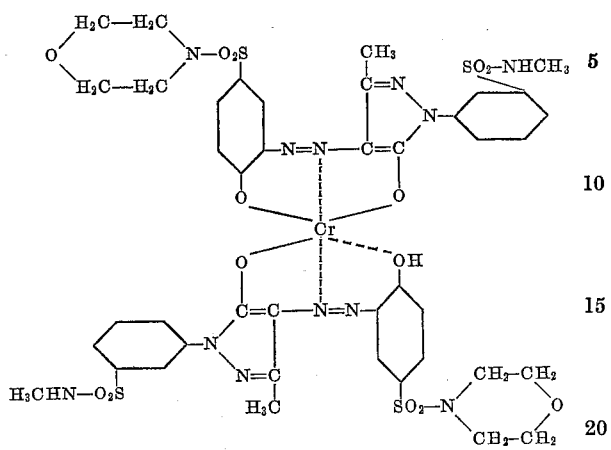

4. The metal-containing azo dyestuff which corresponds to the formula

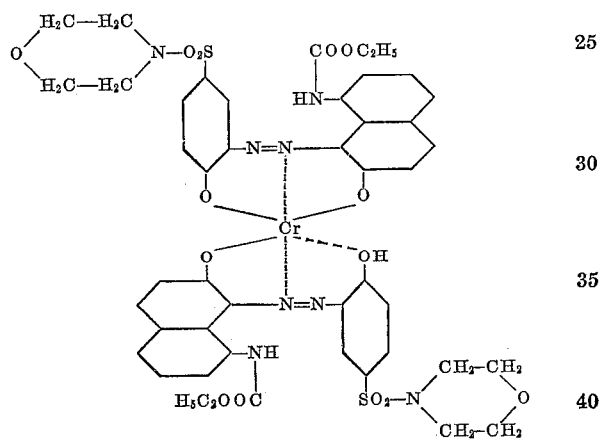

5. An azo dye containing one atom of chromium in complex union with two mols of a compound corresponding to the formula

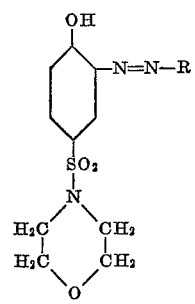

wherein R is an aromatic radical of the benzene series containing an OH group ortho to the azo bridge.

6. An azo dye containing one atom of chromium in complex union with two mols of a compound corresponding to the formula

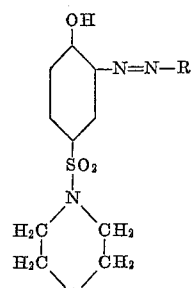

wherein R is an aromatic radical of the naphthalene series containing an OH group ortho to the azo bridge.

7. An azo dye containing one atom of chromium in complex union with two mols of a compound corresponding to the formula

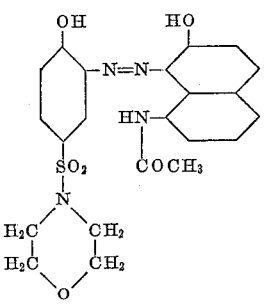

8. An azo dye containing one atom of chromium in complex union with two mols of a compound corresponding to the formula

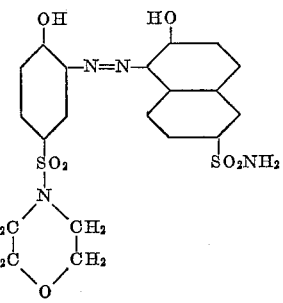

References Cited in the file of this patent
UNITED STATES PATENTS

| | | |
|---|---|---|
| 2,224,144 | Dickey et al. | Dec. 10, 1940 |
| 2,251,813 | West et al. | Aug. 5, 1941 |
| 2,638,707 | Brassel | July 13, 1954 |
| 2,734,895 | Zickendraht et al. | Feb. 14, 1956 |

FOREIGN PATENTS

| | | |
|---|---|---|
| 513,489 | Belgium | Feb. 13, 1953 |